June 30, 1942.　　L. V. McCARTY ET AL　　2,288,536
FUEL FEEDING MECHANISM FOR LIQUID FUEL BURNERS
Filed Dec. 24, 1938　　4 Sheets-Sheet 1

INVENTORS
Lowndes V. McCarty, Roy W. Johnson
BY & Frederick H. Newman
John W. Michael
ATTORNEY.

June 30, 1942. L. V. McCARTY ET AL 2,288,536
FUEL FEEDING MECHANISM FOR LIQUID FUEL BURNERS
Filed Dec. 24, 1938 4 Sheets-Sheet 2
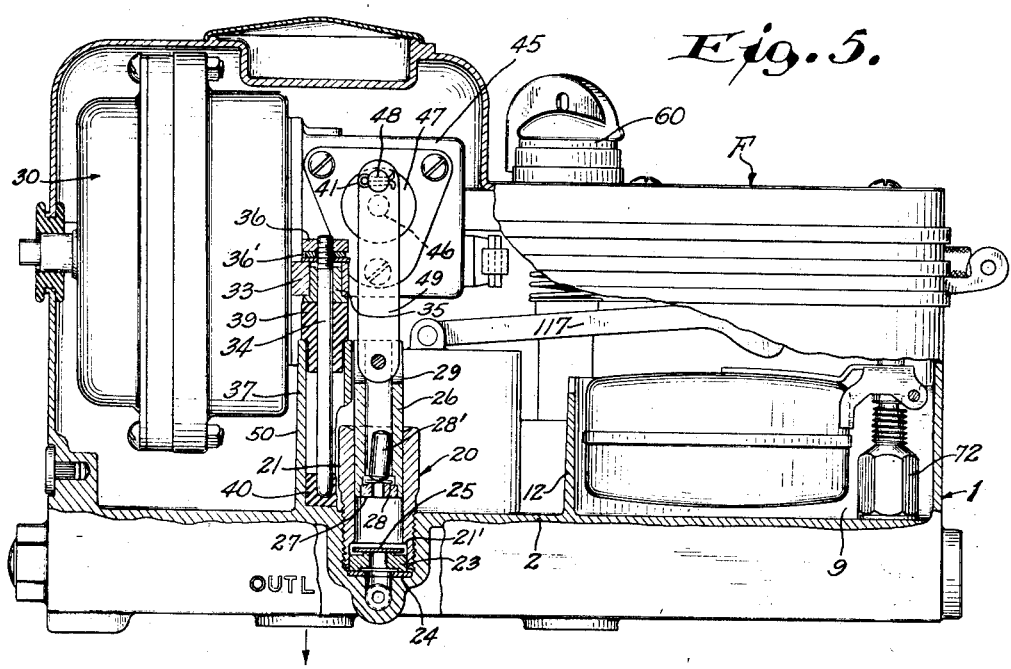
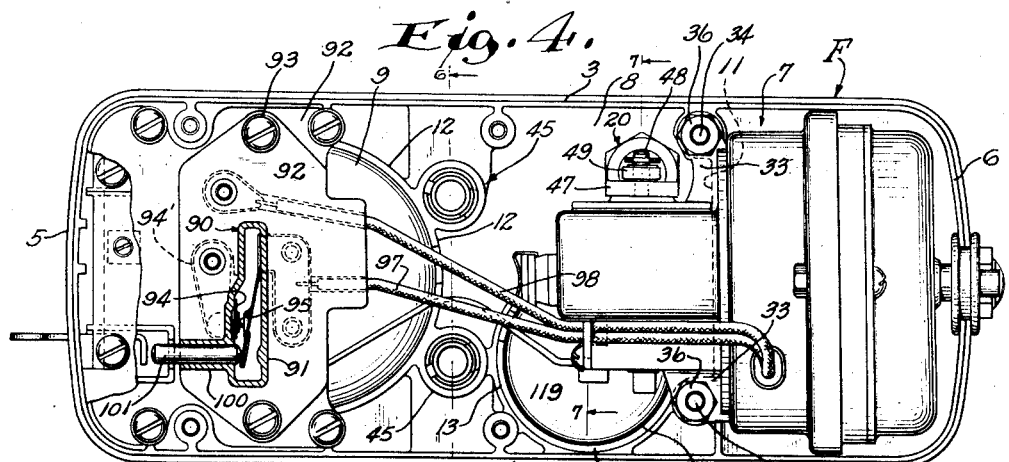
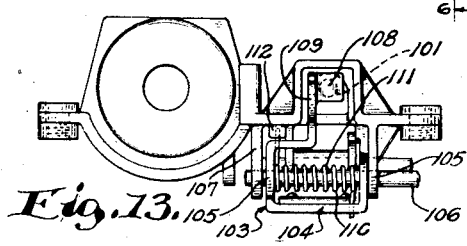
INVENTORS
Lourdes V. McCarty
Roy W. Johnson
Frederick H. Newman
BY John W. Michael ATTORNEY.

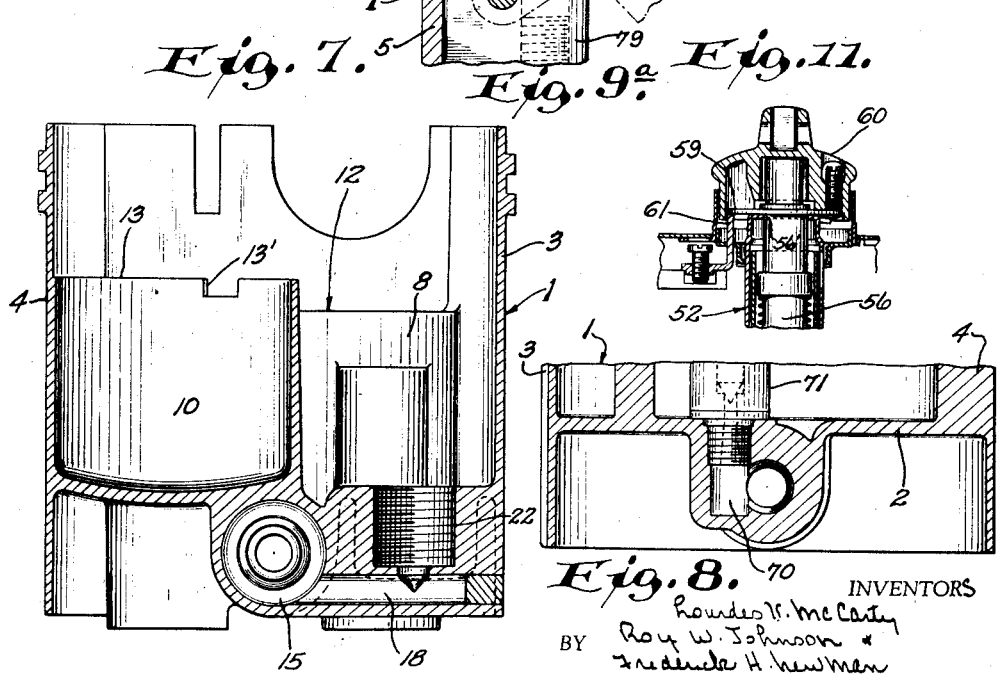

June 30, 1942.  L. V. McCARTY ET AL  2,288,536
FUEL FEEDING MECHANISM FOR LIQUID FUEL BURNERS
Filed Dec. 24, 1938  4 Sheets-Sheet 4

INVENTORS
Lourdes V. McCarty, Roy W. Johnson
& Frederick H. Newman
BY John W. Michael
ATTORNEY.

Patented June 30, 1942

2,288,536

UNITED STATES PATENT OFFICE 2,288,536

FUEL FEEDING MECHANISM FOR LIQUID FUEL BURNERS

Lourdes V. McCarty, Roy W. Johnson, and Frederick H. Newman, Milwaukee, Wis., assignors to Automatic Products Company, Milwaukee, Wis., a corporation of Wisconsin Application December 24, 1938, Serial No. 247,632

3 Claims. (Cl. 158—42.3)

This invention relates to a heating system and to a fuel feeding mechanism for oil burning space heaters of the type adapted for use in homes, stores, tourist camps, rural schools, auditoriums, poultry farms, filling stations, garages, cabins and the like.

An object of the invention is to provide a fuel feeding mechanism of this general character which eliminates the necessity of a fuel tank on the oil burning space heater, the fuel being drawn or pumped from remote bulk storage and then accurately metered to the burner for any desired degree of heat. The remote bulk storage may be an underground tank, a tank in the basement of the dwelling, or a tank or barrel in some other convenient or desired location. In this way the necessity of constantly refilling a small fuel tank associated with the oil burning space heater is avoided. Consequently, handling of oil in the home is avoided. This saves time and labor and has the further advantage of eliminating the possibility of an offensive oil smell. Furthermore, the fuel feeding mechanism may be used on each of a plurality of heaters, all of which will be fed from one fuel supply. Incidentally also, the heating cost is reduced since the oil may be purchased in bulk lots instead of by the gallon.

Another object of the invention is to provide a fuel feeding mechanism of this character which requires but a single pipe line or conduit between the bulk storage and the fuel feeding mechanism. No overflow pipe is necessary. The fuel feeding line or conduit may be in the form of a small copper tubing which may be fished through the walls as easily as an electric cable, thereby making it practical to install a concealed piping job.

Another object of the invention is to provide a fuel feeding mechanism of this character and having these advantages and which is simple, durable, and highly compact in construction, reliable, safe and efficient and noiseless in operation, attractive in appearance and easy and comparatively inexpensive to manufacture, install and maintain.

In accordance with the present invention, liquid fuel is supplied to the main liquid supply chamber provided in the casing of the fuel feeding mechanism by means of a motor driven pump. The fuel flows from the supply chamber to the burner or burners under the control of metering valves which accurately meter the flow to generate the desired degree of heat at the burner. The pump is designed and operated to supply slightly more oil to the liquid supply chamber than the heater or heaters require. The excess oil flows over a dam into a recirculation chamber whereby a constant level is maintained in the liquid supply chamber. The recirculation chamber communicates, through a by-pass, with the intake side of the pump under the regulation of a float controlled by-pass valve. When a predetermined level of oil accumulates in the recirculation chamber the float opens the by-pass valve whereupon the pump merely recirculates oil in the fuel feeding mechanism without lifting any more for the time being up from the storage tank. When the excess has been consumed and proper liquid level conditions again obtain in said chambers, the by-pass valve closes and the pump resumes its function of pumping oil from the storage tank to the supply chamber. Should any of the instrumentalities described fail to function or to function properly so that the oil level continues to rise above the level of the top of the dam between the supply and recirculation chambers, the oil will then flow over a somewhat higher dam into an overflow chamber of a safety cut-off means combined with the fuel feeding mechanism. Accumulation of oil in said overflow chamber will buoy up a float therein and trip the safety cut-off means to cause it to shut off or stop the motor and consequently the pump. Provision is made for conveniently re-setting the safety cut-off from the exterior of the mechanism and restoring the same to its normal operating conditions.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 4 is a view of the fuel feeding device in top plan with the name plate and its companion cover section and the metering valve controls removed;

Figure 5 is a view partly in longitudinal horizontal cross section and partly in side elevation of the structure shown in Figures 1 to 4, the view in side elevation being taken from the opposite side from that shown in Figure 2;

Figure 6 is a view in transverse vertical cross section taken on line 6—6 of Figure 4, the metering valves and associated instrumentalities being removed from the casing;

Figure 7 is a view in transverse vertical cross section taken on line 7—7 of Figure 4 with all of the instrumentalities removed from the casing.

Figure 8 is a fragmentary view in vertical cross section taken on line 8—8 of Figure 2;

Figure 9a is a fragmentary view in section taken on line 9—9 of Figure 9 and showing how the float pivot pin is clamped to its supports;

Figures 10 and 11 are fragmentary views partly in vertical cross section and partly in side elevation showing the metering valve structure and the means for adjusting and controlling the movements of the same;

Figure 12 is a fragmentary view in end elevation showing parts viewed from line 12—12 of Figure 2 and illustrating the construction embodied between the float lever arm and the by-pass valve;

Figure 13 is a detail view in end elevation viewed from line 13—13 of Figure 2 and showing the construction of the re-setting mechanism for the safety cut-off;

Figure 17:
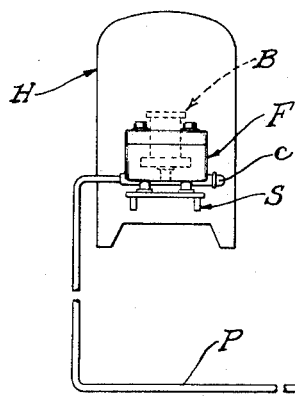
Figure 17 is a diagrammatic view of a heating system embodying the present invention.

Referring to the drawings and more particularly to Figure 17, the reference character H designates a space heater which may be positioned in the room or space to be heated, usually substantially above the level of a bulk storage tank T, which may be positioned in the basement, underground, or any other suitable location. Adjacent the heater the present invention proposes the provision of a fuel feeding device designated generally at F suitably supported on a bracket or other support S and having its outlet connected by means of a connection C with an oil burner B provided in the heater H. A single pipe line or conduit P connects the inlet of the fuel feeding device with the bulk storage tank T. This pipe line is usually copper tubing and may be fished through the walls as easily as an electric cable, thereby making it practical to install a concealed pipe job. Of course, any desired number of space heaters located in different compartments on different levels may be served from one source of supply or from the same bulk storage tank T.

The fuel feeding device F comprises a casing designated generally at 1 and which may be of die casting. The casing 1 has a bottom 2, side walls 3 and 4, and end walls 5 and 6, all forming an integral part of the one casting. Internally the casing is divided up into a motor compartment 7, a liquid supply chamber 8, a recirculating chamber 9, and an overflow chamber 10 forming part of a safety cut-off mechanism. For this purpose the die casting has integral therewith a transverse partition 11 (see Figures 2 and 4). The partition 11 is disposed adjacent to but spaced from the end wall 6 and coacts with this end wall and the portions of the side wall between itself and the end wall to define the motor compartment 7. A curved wall 12 of arcuate form is also formed as an integral part of the die casting and extends vertically in the casing and between the opposed side walls thereof so as to coact with the end wall 5 and the portions of the side walls 3 and 4 between the end wall 5 and itself to define the recirculating chamber. The overflow chamber 10 is defined by an upstanding cylindrical wall 13 also formed as an integral part of the die casting. As will be understood from Figure 4, the liquid supply chamber 8 is defined by the transverse partition 11, the curved wall 12, the wall 13, and the portions of the side walls 3 and 4 and bottom 2 therebetween. The bottom wall 2 of the casing is provided with an integral hollow enlargement or inlet passage 15 to accommodate a strainer 16. At one end this hollow enlargement is provided with an inlet connection 17 with which the pipe line P connects. The passageway in the hollow enlargement which receives a strainer 16 freely communicates with a cross passage 18 provided in the bottom as indicated in dotted lines in Figure 2 and in full lines in Figure 7, and this cross passage in turn freely communicates with the intake side of a pump designated generally at 20.

While the structure of the pump may be varied, it may be advantageously constructed as shown in Figure 5. As there shown, the pump 20 has a pump cylinder or barrel 21, the lower end of which is threaded into a vertical opening 22 provided therefor in the bottom of the casing and communicating with the cross passage 18 (see Figure 7). Between the bottom of the barrel 21 and the bottom of the opening 22 a valve seat 23 is confined, the valve seat being located above a washer 24 which is compressed between the valve seat and the floor of the opening 22. The suction valve 25 of the pump, which is preferably in the form of a disk, rests on and coacts with the top of the valve seat 23. The opening movement of the suction valve is limited by an internal annular shoulder 21' machined on the inside of the barrel of the pump. The pump also includes a pump plunger 26 of tubular form, that is, it has an axial opening therethrough from end to end. The discharge valve of the pump is combined with this hollow pump plunger and comprises a valve seat 27 secured in the lower end of the plunger. A disk valve 28 coacts with the port of the valve seat to regulate the flow therethrough and is biased to closed position by means of a weight 28' or some equivalent biasing means, such as a spring or the like. The upper end of the tubular plunger is cross slotted as at 29.

The present invention proposes to continuously operate the pump 20 and for this purpose an electric motor 30 is provided. The motor may be a slow speed, induction type electric motor of small overall dimensions.

Figure 2:
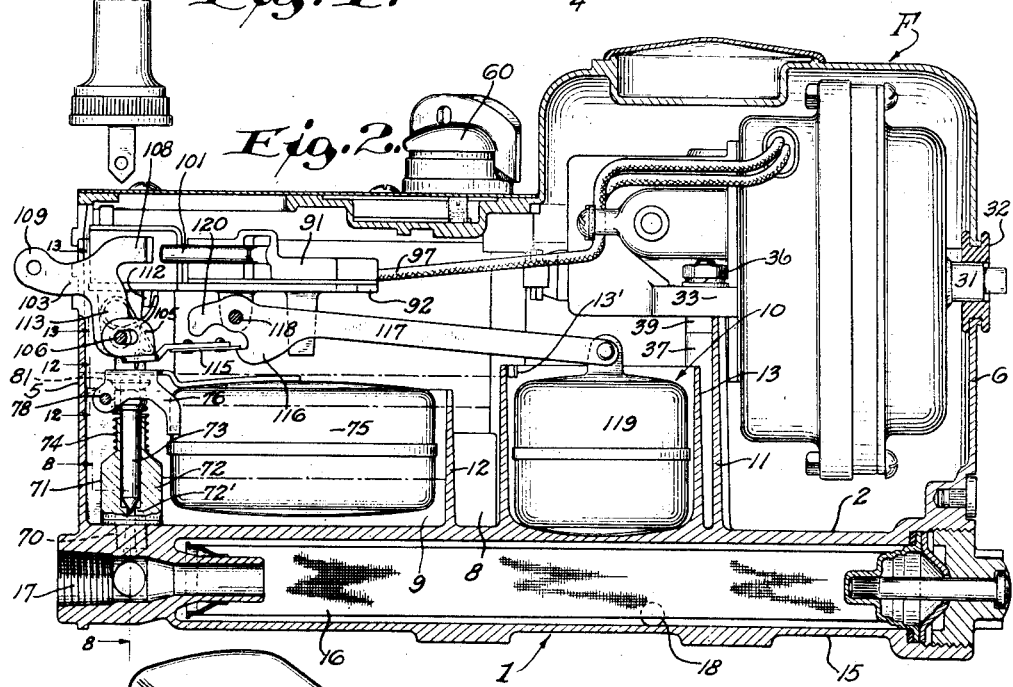
Figure 2 is a view partly in side elevation and partly in longitudinal vertical cross section further illustrating the structure shown in Figure 1, the name plate being applied in Figure 2.
Figure 14:
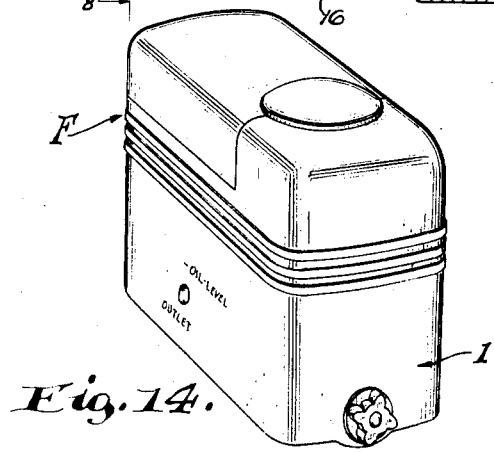
Figure 14 is a detail perspective view showing the exterior of the fuel feeding device when adapted for electrical control.
Figure 3:
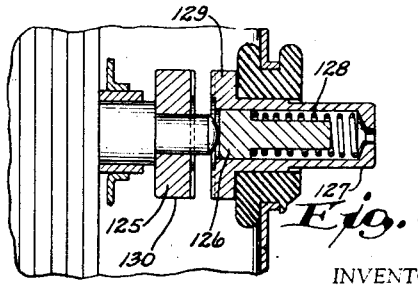
Figure 3 is a fragmentary detail view partly in section and partly in elevation illustrating a special means which may be provided for starting the motor and loading the bearings thereof.

In order to provide for noiseless operation of the fuel feeding mechanism a floating or cushioned three point support is provided for the motor 30. For this purpose, as shown in Figure 2, one end of the armature shaft 31 of the motor has fitted thereon a grommet 32 of elastic oil resistant composition such as neoprene. This grommet, which is of disk-like form, has a peripheral groove which interengages with corresponding formations in the adjacent end wall of the casing and the associated cover section. Supporting lugs 33 are rigidly connected with the inner portion of the motor casing and are symmetrically disposed on the opposite sides of the longitudinal central axis of the motor. Mounting pins 34 are secured to and project downwardly from these lugs. For securing the pins 34 to the lugs, a flanged metal bushing 35 is press fitted on or otherwise suitably secured to each pin 34 adjacent its upper end and these flanged bushings are then interfitted with the vertical openings through the lugs, as illustrated in Figure 5. A nut 36 and lock washer 36' coacting with the upper end of each mounting pin and with the top side of each lug completes and secures the mounting pin to the lug. The mounting pins extend down through hollow posts 37 formed as integral parts of the casing. An elastic supporting bushing or tubular pad 39 is fitted on each mounting pin between its flanged bushing 35 and the top of the adjacent post 37 and the lower portion of each mounting bushing 39 is reduced and interfitted with the upper end of the adjacent post. These mounting bushings 39 are also constituted of elastic oil resistant material such as neoprene. The lower end of each mounting pin extends into the axial opening of a centering bushing 40 also constituted of neoprene. The confining action of the cover exerted through the grommet together with the weight of the motor maintains the motor on its floating mounting and yet provides for noiseless and smooth operation and minimizes vibration.

The output end of the armature shaft of the motor is operatively interconnected with a suitable standard or conventional type of speed reducer, designated generally at 45. The output or driven shaft 46 of this speed reducer projects out through one side wall of the casing thereof and the projecting end portion of the output or driven shaft 46 has a crank disk 47 suitably fixed thereto. A crank pin 48 projects from the disk and is pivotally interconnected with the upper end of a link 49, the lower end of which is interfitted with the slotted end of the pump plunger and pivotally interconnected therewith by means of a pivot pin 50.

With this construction, when the motor is running, the plunger of the pump is constantly reciprocated in the pump barrel so that the pump draws oil up from the bulk storage tank and discharges it into the liquid supply chamber 8. Parts are designed and proportioned so that the pump supplies oil or liquid fuel to the supply chamber in an amount slightly in excess of the requirements of the burner or burners supplied therefrom.

The flow of oil from the supply chamber 8 to the burner or burners is by gravity, but the amount of oil which flows to the burner or burners from the supply chamber is accurately metered to adapt the fuel feeding mechanism to serve more than one heater or burner. Each unit is usually provided with two outlets 51 of identical construction, although frequently only one is used. The one not in use is plugged.

For metering the flow of oil, a metering valve designated generally at 52, is combined with each outlet 51 in use. Each metering valve 52 includes a tubular valve guide 55 preferably of single piece, heavy walled brass tube which is press fitted in the upper end of the outlet opening with which it is associated and has a valve seat 55' machined as an integral part thereof. The tubular and vented metering valve stem 56 is constrained to vertical rectilinear movement in its valve guide by means of a laterally extending guide pin 57 which is a sliding fit in a vertical slot 58 provided in the valve guide 55. A boss or projection 56' (see Figure 11) at the upper end of the valve stem is engaged with an adjustable steel cam 59 combined with the control knob 60. The cam rides on an adjustable abutment 61 combined with the top of the casing and set to determine the low fire position of the metering valve. The high fire position of the valve is controlled by a high fire stop 62. The metering valve is urged to open position by means of a coil spring 63 interposed between an abutment provided therefor in the valve guide and a corner of the metering valve stem. The cam is constrained to ride on its abutment by means of a coil spring 64. The metering construction and control will not be more fully described as it is fully disclosed and claimed in the application of Roy W. Johnson, for "Interchangeable metering valve controls" filed June 23, 1938, Serial No. 215,336. For the purpose of the present invention it is sufficient to understand that the metering valves are controlled as to high and low fire positions as indicated and may be, when a manual control is employed, set, under the control of the cam, to accurately meter the gravity flow of oil from the oil supply chamber to the burner to obtain any desired degree of heat.

Figure 9:
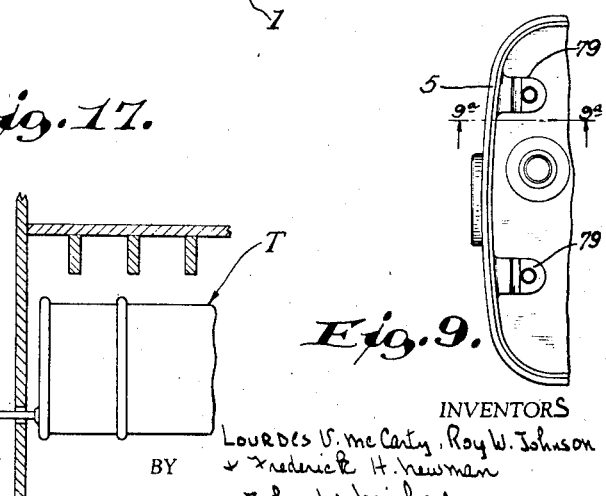
Figure 9 is a fragmentary view in top plan showing the supports for the pivot pin of the float provided in the recirculating chamber.

As indicated, the pump 20 is designed and operated to supply a volume of oil to the supply chamber 8 slightly in excess of the requirements of the burner or burners supplied therefrom. The excess of oil flows over the weir 12' of the dam 12 into the recirculation chamber 9 and in this way a constant level is maintained in the liquid supply chamber 8. When a pre-determined amount of excess oil has accumulated in the recirculation chamber the present invention proposes to by-pass the accumulated excess back to the inlet side of the pump. For this purpose a passage 70 is provided between the recirculation chamber and the inlet passage 15. Flow of liquid through this passage is under the regulation of a by-pass valve designated generally at 71. The by-pass valve 71 comprises a valve casing 72 having one end threaded to the passage 70 and provided internally with a valve seat 72'. A needle valve 73 coacts with the valve seat 72' to control the flow of fluid therepast. A spring 74 biases the valve 73 to open position. A float 75 is disposed in the recirculation chamber 9 and has a float lever 76 secured thereto and provided with spaced ears 77 which are apertured to receive a fulcrum or pivot pin 78. The end of the pin rests on seats 79 provided therefor in the casing (see Figure 9) and are held against these seats by screws 80 (see Figure 9a). The transverse portion of the float lever has a screw 81 adjustably interconnected therewith and retained in any adjustment by means of an adjustment retaining spring 82. The head of the screw immediately overlies the upper end of the needle valve. Consequently, as the level in the recirculation chamber rises, the float being bouyed up, will swing the head of the screw up away from the upper end of the needle valve to allow the spring 74 to open the valve 73. On the other hand, as the level of the recirculation chamber drops, the float 75 will swing downwardly and the head of the screw 81 will press downwardly against the upper end of the needle valve 73 and push it down to closed position.

Figure 1:
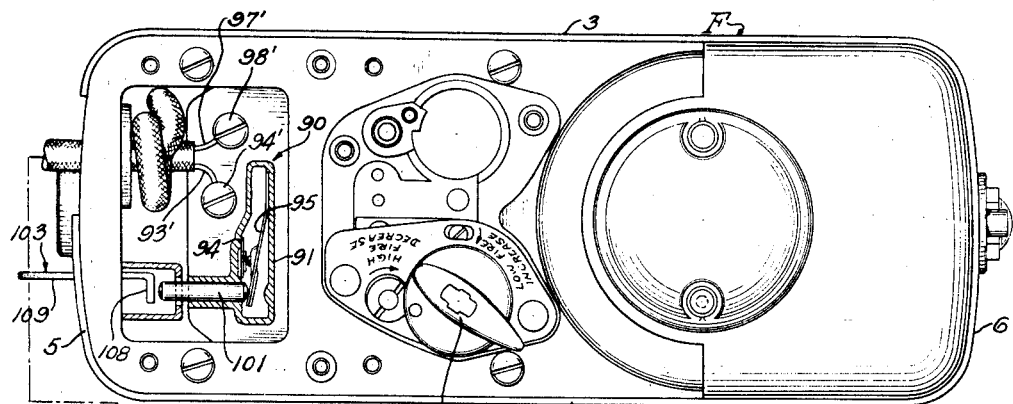
Figure 1 is a view in top plan showing a liquid fuel feeding mechanism embodying the present invention, the name plate provided on one section of the top being removed and portions being broken away and shown in horizontal cross section for the sake of illustration.

In the event the instrumentality described fails to function or fails to function properly so that the level of the liquid in the main supply chamber continues to rise even after accumulation of excess in the recirculation chamber, then the present invention proposes to provide means for automatically shutting off the motor and consequently stopping the pump. In carrying out this purpose, the supply of electric current to the motor is regulated by means of a motor control switch designated generally at 90. This switch 90 comprises a casing 91 of electrical insulating material suitably secured to a supporting plate 92 fastened by screws 93 on supporting lugs provided therefor in the casing. Within the housing of the switch is a fixed contact 94 and a movable spring contact 95. The inherent resiliency of the contact 95 biases it into engagement with the contact 94, that is, to closed position. One side of the source of current is connected to the fixed contact 94 by means of wire 93' and terminal 94' (see Figures 1 and 4). An insulated conductor 97 connects the terminal of the movable contact with one of the motor terminals. The other motor terminal is connected by means of an insulating conductor 98 with the terminal 98' on the plate 92, which in turn connects by means of wire 97' to the other side of the source of supply of electric current. The switch casing also has a tubular guide 100 embodied in its structure and in which a switch operating pin 101 is slidably fitted. This pin may be of insulating material and has its inner end engaged with the free end of the movable contact. When the pin is pushed inwardly it flexes the movable contact away from the fixed contact to break the motor circuit. The outer end of the pin is disposed in the path of a trip lever 103.

The trip lever 103 has a U-shaped body portion 104, the legs 105 of which are provided with openings through which a fulcrum pin 106 extends. On the outsides of the legs 105 of the trip lever apertured lugs 107 are disposed, these lugs being integral with and extending downwardly from the supporting plate 92 and having their apertures snugly fitting and supporting the ends of the fulcrum pin 106. One of the legs 105 of the trip lever has integral therewith a pin engaging lever arm 108 of angular form which extends inwardly into the casing and has its laterally disposed portion positioned to engage the outer end of the switch operating pin. A rearwardly extending finger piece or operating lever arm 109 is also integral with the same leg 105 of the trip lever and with the switch operating arm and projects through a slot in the casing so that it may be conveniently manipulated from the exterior. A spring 110 is provided for biasing or actuating the trip lever to cause it when released to open the motor switch. A portion of this spring, designated at 111, is coiled about the fulcrum pin 106 and one terminal thereof is extended outwardly from the fulcrum pin and engages a spring abutment 112 provided on the supporting plate 92. The other terminal of the spring is looped as at 113 and then interengaged with an opening provided therefor in the body portion of the trip lever. The legs 105 of the U-shaped body portion of the trip lever have openings therein somewhat larger than the fulcrum pin, one of the openings being just slightly larger than the fulcrum pin and the other being oblong as shown in Figure 2. This permits the trip lever 103 to be rocked laterally to manually release it.

Normally, the trip lever 103 is releasably secured in inoperative position and for this purpose a latch plate 115 is fastened to the body portion of the trip lever and extends inwardly for cooperative engagement with the latching hook 116 of a latching lever 117. Adjacent its hook 116 the lever 117 is fulcrumed as at 118 on the plate 92. The end of the lever remote from its hook 116 is pivotally connected to a safety float 119 disposed in the overflow chamber 10.

With this construction the trip is latched in inoperative position as long as normal liquid level obtains in the fuel feeding mechanism. However, if the mechanism fails to function or to function properly then the level of the liquid will continue to rise until liquid flows through the weir 13' of the dam 13 and accumulates in the overflow chamber 10. This buoys up the float 119 and swings the hook 116 to cause it to release the latch plate 115 and allow the spring 110 to actuate the trip lever 103 and thereby punch the switch operating pin 101 inwardly and open the motor switch 90.

In order that the device may be conveniently reset by manipulation of the trip lever the latching lever 117 has a resetting arm 120 which overlies the latch plate so that by swinging the trip lever 103 in a counter-clockwise direction as shown in Figure 2 the arm 120 engages the latch plate 115 to reset the safety cut-off. In the resetting of the device the float 119 displaces the liquid from the chamber 10 back into the liquid supply chamber 8.

Once the device has been set in operation it usually requires no attention. However, after a long period of shut-down, for instance all during the summer months, it may be necessary, upon starting up the control in the fall, to prime the oil lifter and to turn over the motor, notwithstanding it is proposed to employ a self-starting shaded pole induction motor. To facilitate starting of the motor and also to load the bearings thereof to further quiet the operation, the armature shaft at the outer end of the motor instead of extending through the grommet may be rounded as at 125 and engaged with a suitably formed bearing pad 126 supported in a bearing sleeve 127. In this instance, a combined bearing and starting sleeve 127 is mounted in the grommet for rotation as well as longitudinal sliding movement. The outer end of the bearing sleeve 127 is closed and a coil spring 128 is interposed between this closed outer end and the bearing plunger to cause the bearing pad to have effective engagement with the adjacent end of the armature shaft and also to allow the bearing sleeve to be shifted axially and rotated for the purpose of starting the motor. In carrying out this latter function a toothed flange 129 provided on the inner end of the sleeve is brought into engagement with a cooperable toothed collar 130 fixed to the armature shaft to facilitate manual turning over of the same.

The fuel feeding mechanism above described and constructed in exactly the same manner as shown and disclosed, may be employed in devices which are thermostatically controlled rather than manually. That is to say, instead of regulating the position of the metering valve from the manual control, a thermostatically operated means may be employed to change the position of the metering valve or valves and hence vary the degree of heat which the burner generates. Under such circumstances the control knobs 60 and their associated instrumentalities are removed leaving only the tubular valve guides, the metering valve stems 56', their spring 63 and the associated high and low fire stops. The manual control devices are then replaced by the mechanism shown in Figures 15 and 16.

Figure 15:
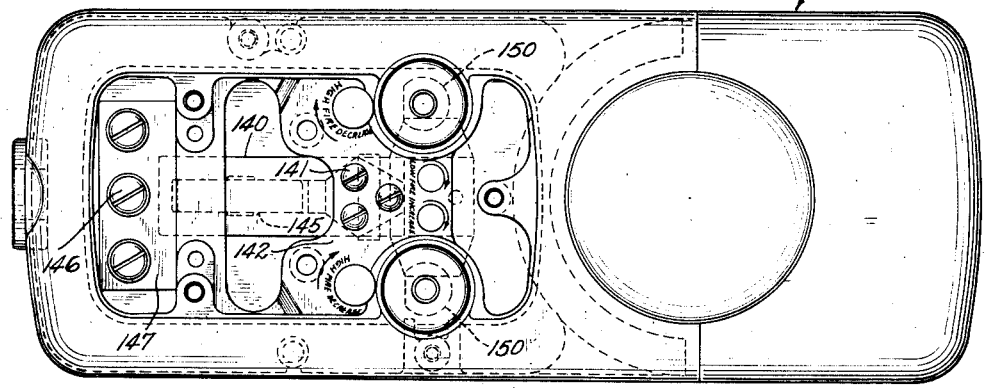
Figure 15 is a view in top plan of the structure shown in Figure 14 with the name plate removed.
Figure 16:
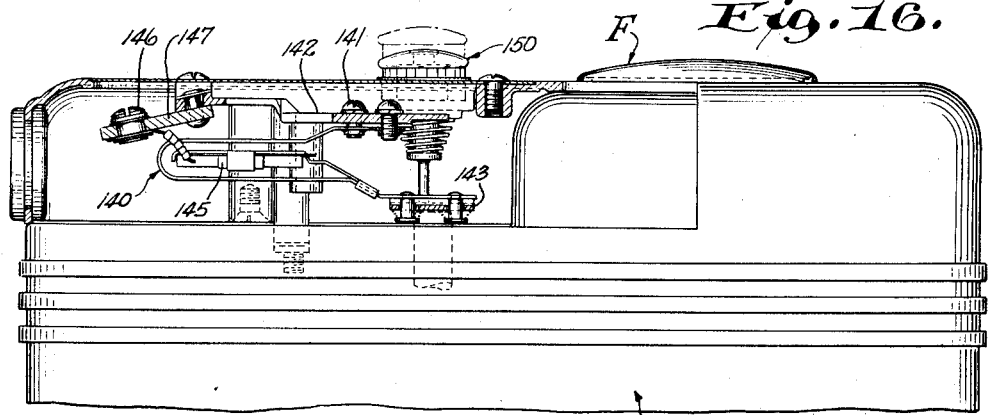
Figure 16 is a view partly in side elevation and partly in vertical cross section of the structures shown in Figures 14 and 15.

As shown in Figures 15 and 16, the thermostatic control comprises a generally U-shaped bi-metallic element designated at 140 and having one leg fastened by screws 141 to a mounting plate 142 of insulating material. The lower leg of the bi-metallic element carries a cross arm 143 by means of rivets and springs and the cross arm in turn overlies the protuberance of the metering valve stems and the low fire stops. In between the legs of the bi-metallic element an electric heating element 145 is disposed and its terminals are connected to the terminals 146 on an insulating panel 147 supported in the casing which encloses the structure just described. The terminals 146 are connected in circuit with the room thermostat in the usual manner. When the room thermostat calls for heat, electric current flows through the heating element 145 and the bi-metallic element is flexed to allow the metering valves to open thereby increasing the heat which the burner generates. When the room thermostat is satisfied, current flow through the electric heating element is shut off and the bi-metallic element cools off and returns to its normal position under the influence of its own inherent elasticity or bias, thereby moving the metering valve stems to low fire position. A spring biased manual shut off knob 150 overlies each metering valve stem to provide for complete shutting off of the flow of fuel to the burner when this is desired. This type of spring-biased manual shut-off knob is shown and described in detail in the application of Roy W. Johnson and H. M. Reeves for "Interchangeable control valve," filed September 20, 1937, Serial No. 164,792, and assigned to the assignee of this present application.

While I have shown and described several constructions in which the invention may be advantageously embodied, it is to be understood that the constructions shown have been selected merely for the purpose of illustration or example and that various changes in the size, shape and arrangement of the parts may be made without departing from the spirit of the invention or the scope of the subjoined claims.

The invention claimed is:

1. A fuel feeding mechanism for liquid fuel burning space heaters comprising a casing having a liquid supply chamber, a recirculating chamber and an overflow chamber, dams separating said chambers, a motor driven pump having its intake connected to a source of supply of liquid fuel and its outlet discharging into said supply chamber, a by-pass between said recirculating chamber and the intake side of the pump, a valve regulating flow through said by-pass, a float in said recirculating chamber controlling said valve, safety cut-off means acting when tripped to shut off said motor, and a float in said overflow chamber connected in controlling relation with said safety cut-off means and functioning upon overflow of liquid into said overflow chamber to trip said safety cut-off means whereby to shut off said motor and stop said pump, said safety cut-off mechanism including a lever operable from the exterior of the casing and shiftably interconnected with the other elements of the safety cut-off mechanism so as to be adapted to be manually manipulated to effect manual shutoff of the motor as well as to effect resetting of the safety cut-off mechanism.

2. A liquid fuel feeding mechanism comprising a casing having a combined liquid fuel supply and constant level chamber provided with an inlet and an outlet, a metering valve for said outlet positioned in said chamber, a motor-driven pump in said chamber connected with said inlet and having an intake adapted to be connected to a source of supply of liquid fuel and discharging into said chamber, a recirculating chamber in the casing for receiving fuel from said supply chamber to maintain a constant level of liquid fuel in the supply chamber, and a float-controlled valved connection between said recirculating chamber and the intake side of said pump.

3. A liquid fuel feed mechanism comprising a casing having a combined liquid fuel supply and constant level chamber provided with an inlet and an outlet, a metering valve for said outlet positioned in said chamber, a pump in said chamber connected with said inlet and having an intake adapted to be connected to a source of supply of liquid fuel and discharging into said chamber, a continuously operating motor for driving said pump, a recirculating chamber in the casing for receiving fuel from said supply chamber to maintain a constant level of liquid fuel in the supply chamber, and a float-controlled valved connection between said recirculating chamber and the intake side of the pump, a safety cut-off mechanism acting when tripped to shut off said motor, and an overflow chamber having liquid level responsive means in the casing and functioning to trip said safety cut-off mechanism in the event the level of the liquid fuel in the liquid supply chamber and recirculating chamber rises a predetermined extent above the constant level normally maintained in said supply chamber.

LOURDES V. McCARTY.
RAY W. JOHNSON.
FREDERICK H. NEWMAN.